(12) United States Patent
Tomishima et al.

(10) Patent No.: US 10,759,426 B2
(45) Date of Patent: Sep. 1, 2020

(54) TRANSMISSION DEVICE, RECEPTION DEVICE, TRANSMISSION METHOD, RECEPTION METHOD, AND COMMUNICATION SYSTEM

(71) Applicant: Panasonic Intellectual Property Management Co., Ltd., Osaka (JP)

(72) Inventors: Daisuke Tomishima, Toyama (JP); Junji Soumon, Ishikawa (JP); Yasunobu Akaoka, Kanagawa (JP)

(73) Assignee: PANASONIC INTELLETUAL PROPERTY MANAGEMENT CO., LTD., Osaka (JP)

( * ) Notice: Subject to any disclaimer, the term of this patent is extended or adjusted under 35 U.S.C. 154(b) by 99 days.

(21) Appl. No.: 16/081,387

(22) PCT Filed: Feb. 13, 2017

(86) PCT No.: PCT/JP2017/005041
§ 371 (c)(1),
(2) Date: Aug. 30, 2018

(87) PCT Pub. No.: WO2017/154463
PCT Pub. Date: Sep. 14, 2017

(65) Prior Publication Data
US 2019/0061759 A1 Feb. 28, 2019

(30) Foreign Application Priority Data

Mar. 11, 2016 (JP) .................................. 2016-048922

(51) Int. Cl.
*B60W 30/165* (2020.01)
*B60W 30/10* (2006.01)
(Continued)

(52) U.S. Cl.
CPC .......... *B60W 30/165* (2013.01); *B60W 30/10* (2013.01); *B60W 30/14* (2013.01);
(Continued)

(58) Field of Classification Search
CPC ....... B60W 30/165; B60W 30/10; G08G 1/16
See application file for complete search history.

(56) References Cited

U.S. PATENT DOCUMENTS

2013/0131925 A1   5/2013  Isaji et al.
2014/0309836 A1*  10/2014 Ollis ........................ G08G 1/22
                                                   701/25

(Continued)

FOREIGN PATENT DOCUMENTS

JP    2013-126854    6/2013
JP     5458666 B    4/2014

OTHER PUBLICATIONS

International Search Report of PCT application No. PCT/JP2017/005041 dated May 16, 2017.

*Primary Examiner* — Kira Nguyen
(74) *Attorney, Agent, or Firm* — Greenblum & Bernstein, P.L.C.

(57) ABSTRACT

A first wireless device is mountable in a vehicle. An acquiring unit acquires position information on the vehicle in which the first wireless device is mounted. A calculating unit calculates a difference between the position information acquired by the acquiring unit and an ideal route for the vehicle. A communication unit transmits a packet signal that contains the difference calculated by the calculating unit and the position information acquired by the acquiring unit.

6 Claims, 10 Drawing Sheets

(51) Int. Cl.
*G08G 1/16* (2006.01)
*B62D 6/00* (2006.01)
*B60W 30/14* (2006.01)
*G08G 1/00* (2006.01)
*G08G 1/09* (2006.01)
*B60W 40/06* (2012.01)
*G08G 1/01* (2006.01)

(52) U.S. Cl.
CPC ............... *B60W 40/06* (2013.01); *B62D 6/00* (2013.01); *G08G 1/00* (2013.01); *G08G 1/0129* (2013.01); *G08G 1/09* (2013.01); *G08G 1/16* (2013.01); *G08G 1/167* (2013.01); *B60W 2510/20* (2013.01); *B60W 2540/18* (2013.01); *B60W 2754/10* (2020.02)

(56) References Cited

U.S. PATENT DOCUMENTS

| | | | | |
|---|---|---|---|---|
| 2015/0081189 | A1* | 3/2015 | Fairgrieve | B60W 30/16 701/96 |
| 2016/0071418 | A1* | 3/2016 | Oshida | G08G 1/22 701/23 |
| 2016/0357262 | A1* | 12/2016 | Ansari | G06F 3/017 |
| 2017/0168503 | A1* | 6/2017 | Amla | B60W 30/165 |
| 2018/0137763 | A1* | 5/2018 | Derag rden | G08G 1/161 |

* cited by examiner

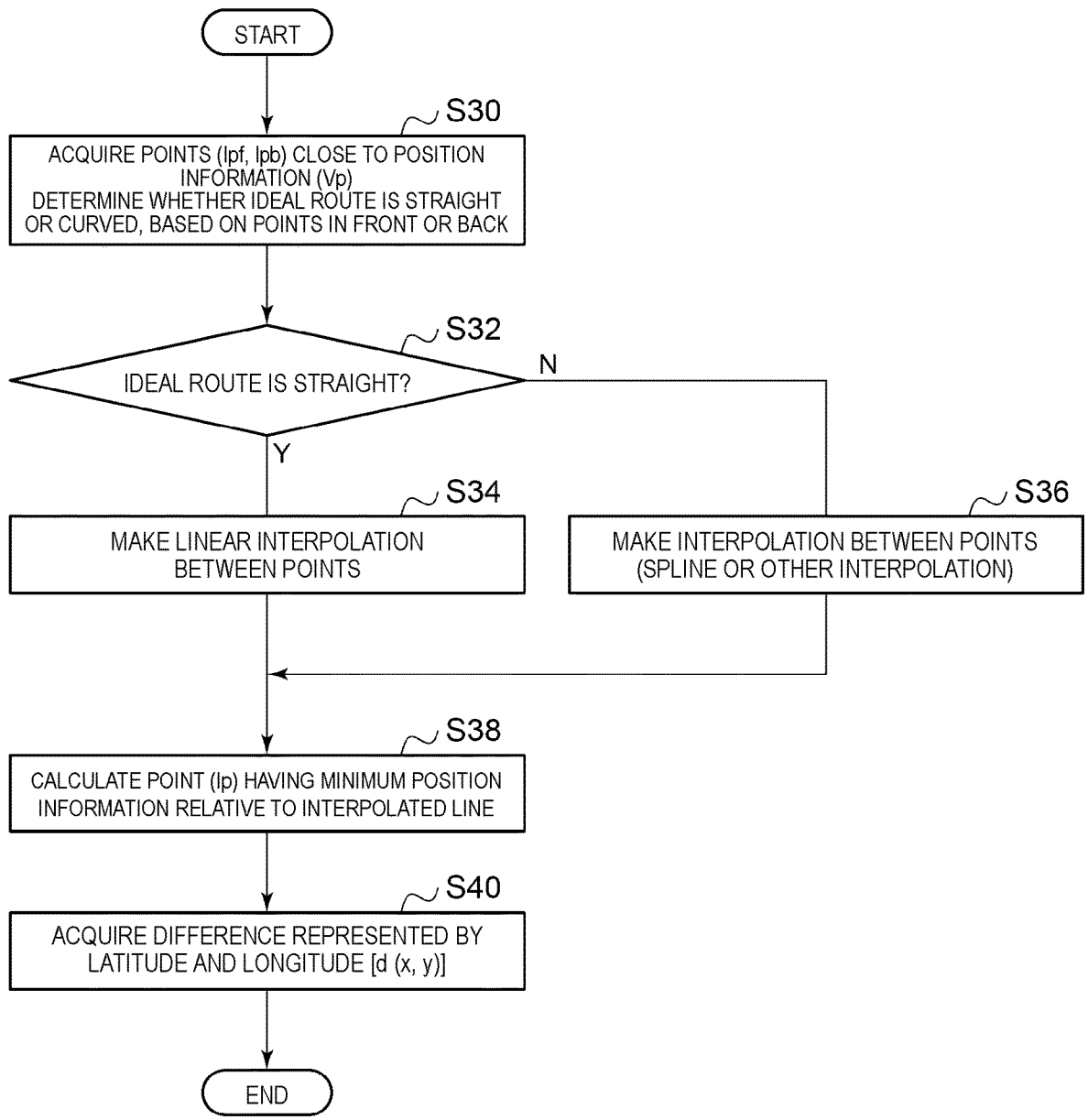

TRANSMISSION DEVICE, RECEPTION DEVICE, TRANSMISSION METHOD, RECEPTION METHOD, AND COMMUNICATION SYSTEM

CROSS-REFERENCE TO RELATED APPLICATIONS

This application is a U.S. national stage application of the PCT International Application No. PCT/JP2017/005041 filed on Feb. 13, 2017, which claims the benefit of foreign priority of Japanese patent application 2016-048922 filed on Mar. 11, 2016, the contents all of which are incorporated herein by reference.

TECHNICAL FIELD

The present invention relates to communication technology, and more particularly, to a transmission device, a reception device, a transmission method, a reception method, and a communication system that transmit or receive a signal containing predetermined information.

BACKGROUND ART

When a vehicle acquires information from a followed, leading vehicle through inter-vehicle communication, this vehicle determines its trajectory, based on this information, thereby performing following drive. More specifically, the vehicle determines a trajectory of the followed, leading vehicle, based on a speed and steering angle of the followed, leading vehicle which have been acquired from the followed, leading vehicle through the inter-vehicle communication. Based on this trajectory, then, the vehicle determines virtual road dimensions in front of the vehicle itself (for example, see PTL 1).

CITATION LIST

Patent Literature

PTL 1: Unexamined Japanese Patent Publication No. 2013-126854

SUMMARY OF THE INVENTION

An object of the present invention is to provide a technique for performing following drive along a route that is close to an ideal route.

A transmission device according to an aspect of the present invention is a transmission device that is mountable in a vehicle. This transmission device includes: an acquiring unit that acquires position information on the vehicle in which the transmission device is mounted; a calculating unit that calculates a difference between the position information acquired by the acquiring unit and an ideal route for the vehicle; and a transmitter that transmits the difference calculated by the calculating unit and the position information acquired by the acquiring unit.

Another aspect of the present invention is a reception device. This device is a reception device that is mountable in a vehicle. The reception device includes: a receiver that receives a signal from a transmission device mounted in another vehicle, the signal containing position information on the other vehicle and a difference between the position information on the other vehicle and an ideal route for the other vehicle; and a processor that performs a process, based on the difference and the position information that are contained in the signal received by the receiver.

Further another aspect of the present invention is a transmission method. This method is a transmission method in a transmission device that is mountable in a vehicle. The transmission method includes: acquiring position information on the vehicle in which the transmission device is mounted; calculating a difference between the acquired position information and an ideal route for the vehicle; and transmitting the calculated difference and the acquired position information.

Still another aspect of the present invention is a reception method. This method is a reception method in a reception device that is mountable in a vehicle. The reception method includes: receiving a signal from a transmission device mounted in another vehicle, the signal containing position information on the other vehicle and a difference between the position information on the other vehicle and an ideal route for the other vehicle; and performing a process, based on the difference and the position information that are contained in the received signal.

Yet another aspect of the present invention is a communication system. This communication system includes: a transmission device that is mountable in a vehicle; and a reception device that is mountable in another vehicle. The transmission device includes: an acquiring unit that acquires position information on the vehicle in which the transmission device is mounted; a calculating unit that calculates a difference between the position information acquired by the acquiring unit and an ideal route for the vehicle; and a transmitter that transmits the difference calculated by the calculating unit and the position information acquired by the acquiring unit. The reception device includes: a receiver that receives the difference and the position information from the transmission device; and a processor that performs a process, based on the difference and the position information that are received by the receiver.

Any combinations of the above-described components and modifications of the features of the present invention in methods, devices, systems, non-transitory recording media, and computer programs are still effective as other aspects of the present invention.

According to the present invention, it is possible to perform following drive along a route that is close to an ideal route.

BRIEF DESCRIPTION OF DRAWINGS

FIG. 7 is a flowchart of calculating procedures performed by the calculating unit in FIG. 2.

DESCRIPTION OF EMBODIMENTS

Figure 1:
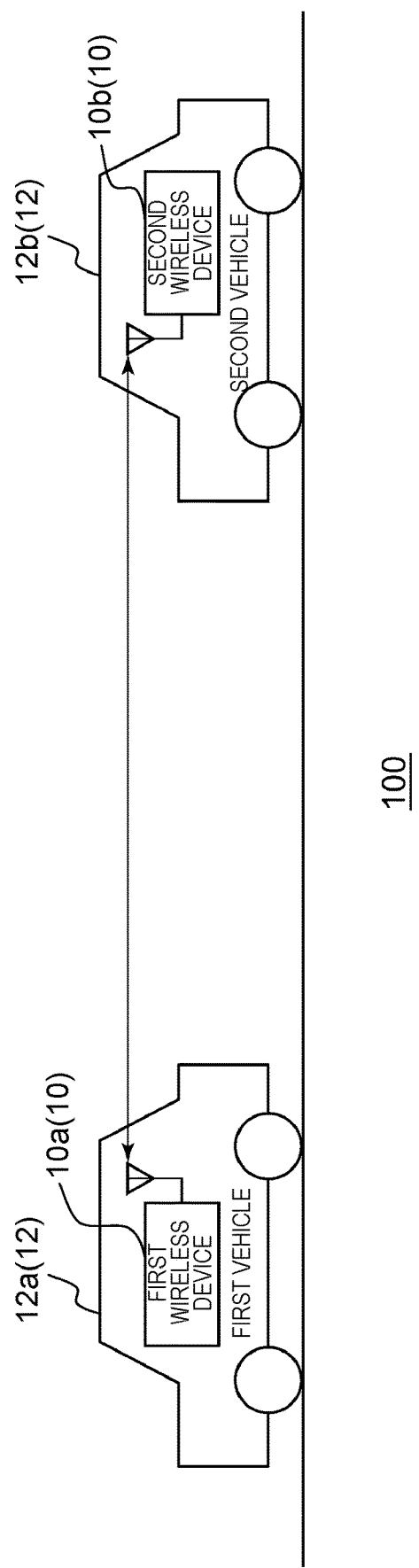
FIG. 1 illustrates a configuration of a communication system according to a first exemplary embodiment of the present invention.

Before some exemplary embodiments of the present invention are described, a problem associated with conventional systems will be described briefly. A trajectory determined through inter-vehicle communication corresponds to a trajectory along which a followed, leading vehicle has actually run. In this followed, leading vehicle, a path regarded as being ideal, which is referred to below as an ideal route, is generated. However, the trajectory of the followed, leading vehicle may deviate from the ideal route, due to some factors, including road surface conditions (slope and coefficient of friction), a weather (rain, wind, or snow), and vehicle conditions (speed, weight, and performance). For this reason, the following vehicle may fail to follow the ideal route for the followed, leading vehicle.

First Exemplary Embodiment

Before a specific description of some exemplary embodiments of the present invention is given, an outline of the present invention will be described. Exemplary embodiments of the present invention relate to a communication system that conducts inter-vehicle communication between wireless devices mounted in vehicles. More specifically, one vehicle follows another vehicle by using the inter-vehicle communication. The inter-vehicle communication may also be referred to below as the vehicle to vehicle (V2V) communication. The inter-vehicle communication utilizes radio communication in an intelligent transport system (ITS) to which a 700 MHz band (760 MHz) is allocated, and allows information to be broadcasted (notified) among vehicles and infrastructures. One example of specifications (physical layer's specifications) for inter-vehicle communication in Japan is ARIB STD-T109. Information transmitted or received through the inter-vehicle communication may be parameters; examples of such parameters include: a vehicle ID (32 bits) and time information as common area management information; a latitude, longitude, and altitude as position information; a vehicle speed, a vehicle azimuth, forward or backward acceleration, a shift position, and a steering angle as vehicle information; and a vehicle size, width, and length as vehicle attribute information. In addition, a 64-byte free area is available for transmitting information containing free contents.

In a case where a first vehicle follows a second vehicle by using the inter-vehicle communication described above, the first vehicle may be referred to as the leading vehicle, whereas the second vehicle is referred to as the following vehicle. For example, the leading vehicle may perform automated driving. The following vehicle continuously (or sequentially) acquires the position (latitude and longitude) of the leading vehicle through the inter-vehicle communication, thereby generating a following route. Then, the following vehicle follows the leading vehicle along the following route while avoiding a collision with the leading vehicle. Under such circumstances, this automated driving leading vehicle has an ideal route (information on sequential latitudes and longitudes) leading to its destination and controls the vehicle itself so as to run along the ideal route. However, the leading vehicle may fail to run along the ideal route, due to various factors, including road surface conditions (slope and coefficient of friction), a weather (rain, wind, or snow), and vehicle conditions (speed, weight, and performance). In this case, the following vehicle may generate the following route, based on the route made up of the coordinates of positions at which the leading vehicle has run, namely, based on the positional coordinates of the route deviating from the ideal route. As a result, the following vehicle might run along a route affected by its surroundings.

Because the following vehicle does not know the ideal route for the leading vehicle, the above disadvantage may arise. To deal with this disadvantage, it is necessary for the leading vehicle to notify the following vehicle of its ideal route through the inter-vehicle communication. However, this method may be difficult to carry out, because the bit rate is not high enough to notify the ideal route through the inter-vehicle communication. Furthermore, the notification of the ideal route may be unfavorable in terms of security, because the information is informed through the inter-vehicle communication. It is possible to notify the following vehicle of the ideal route for the leading vehicle through any communication means other than the inter-vehicle communication. However, the addition of such communication means may cause an increase in an overall device cost. In addition, the communication means involves two-way communication between the leading and following vehicles and thus generates a connection between the leading and following vehicles which is unnecessary for the inter-vehicle communication. This may increase a process delay and system-related complexity.

To address the above disadvantage, a leading vehicle according to this exemplary embodiment measures position information on the leading vehicle, and then calculates a difference between the measured position information and an ideal route for the leading vehicle. In this case, the difference may be represented by differences between latitudes and between longitudes. Then, the leading vehicle notifies the calculated difference and its position information through the inter-vehicle communication. The following vehicle receives the difference and the position information from the leading vehicle. Then, the following vehicle calculates position information regard as being ideal, referred to below as ideal position information, at which the leading vehicle needs to actually run. Furthermore, the following vehicle generates a following route, based on a history of the ideal position information, and performs following drive along the following route. In short, the following route is generated based on the ideal route for the leading vehicle, instead of the trajectory for the leading vehicle.

FIG. 1 illustrates a configuration of communication system 100. Communication system 100 includes first wireless device 10a and second wireless device 10b, which are collectively called wireless devices 10. First wireless device 10a is mounted in first vehicle 12a, whereas second wireless device 10b is mounted in second vehicle 12b. First vehicle 12a and second vehicle 12b are collectively called vehicles 12. First vehicle 12a corresponds to the above leading vehicle, whereas second vehicle 12b corresponds to the above following vehicle. Thus, when first wireless device 10a mounted in the leading vehicle notifies information, second wireless device 10b mounted in the following vehicle receives the information. This configuration causes first vehicle 12a to run in an automated driving manner and further causes second vehicle 12b to follow first vehicle 12a. In this case, the number of following vehicles is not limited to one, and may be plural. In this case, three or more wireless devices 10 and vehicles 12 may be included.

Figure 2:
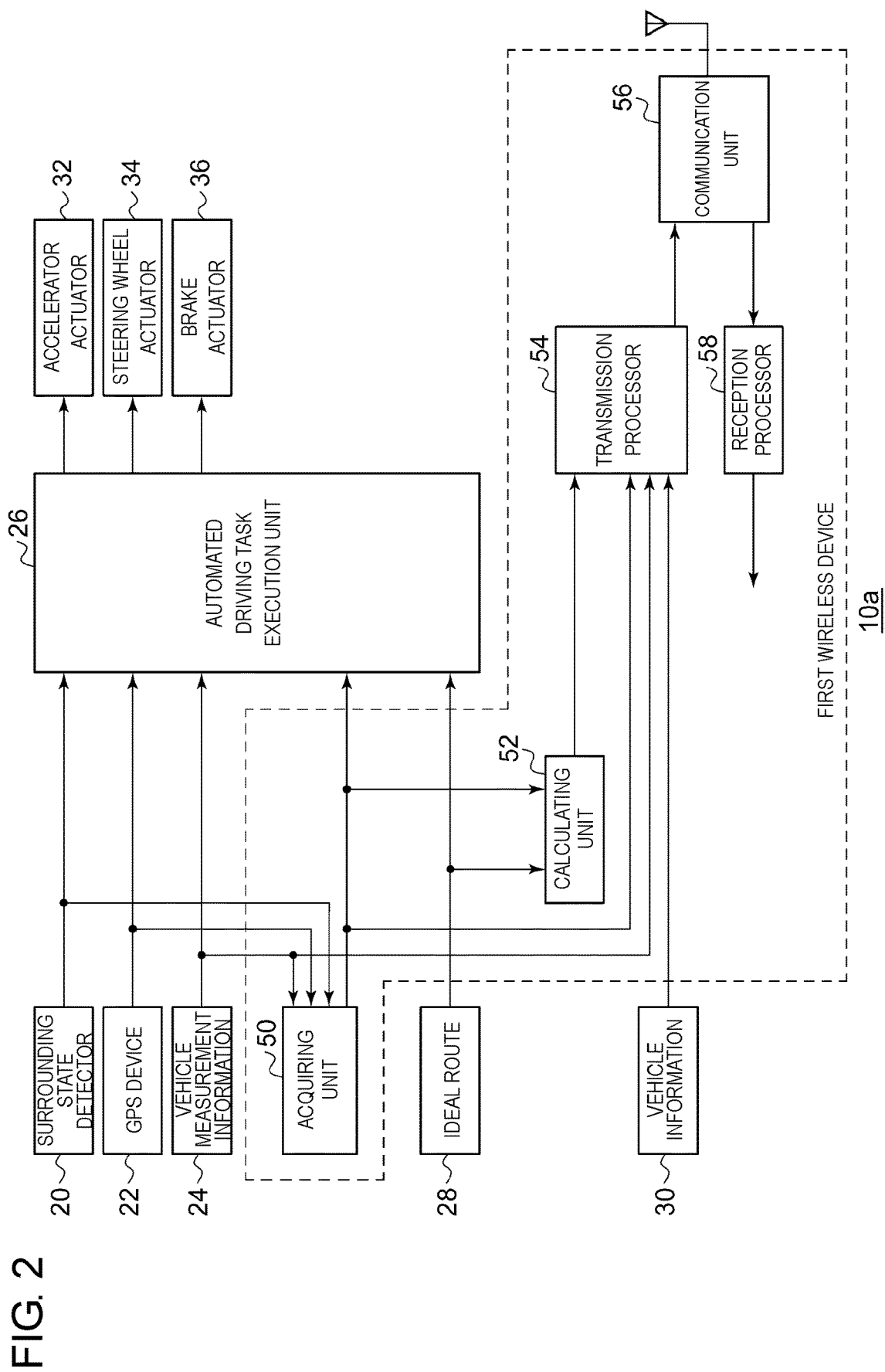
FIG. 2 illustrates a configuration of a first wireless device in FIG. 1.

FIG. 2 illustrates a configuration of first wireless device 10a. First wireless device 10a is connected to surrounding state detector 20, global positioning system (GPS) device 22, vehicle measurement information 24, automated driving task execution unit 26, ideal route 28, vehicle information 30, accelerator actuator 32, steering wheel actuator 34, and brake actuator 36. First wireless device 10a includes acquiring unit 50, calculating unit 52, transmission processor 54, communication unit 56, and reception processor 58.

Surrounding state detector 20 detects a surrounding state of first wireless device 10a. For example, surrounding state detector 20 may include an in-vehicle camera, a light detection and ranging (LIDAR), sonar, or a time-of-flight (TOF) camera. Alternatively, surrounding state detector 20 may include a combination of an in-vehicle camera, a LIDAR, sonar, and a TOF camera. Surrounding state detector 20 outputs its detection result to both automated driving task execution unit 26 and acquiring unit 50.

GPS device 22 receives a signal from a GPS satellite to measure a position at which first vehicle 12a is present. GPS device 22 outputs its measurement result to both automated driving task execution unit 26 and acquiring unit 50. Vehicle measurement information 24 may be information regarding a vehicle which is acquired from an electronic control unit (ECU) in first vehicle 12a and contain a vehicle speed, a steering angle, and shift information, for example. Vehicle measurement information 24 is supplied to automated driving task execution unit 26, acquiring unit 50, and transmission processor 54.

Acquiring unit 50 receives the detection result from surrounding state detector 20, the measurement result from GPS device 22, and vehicle measurement information 24. Based on the detection result, the measurement result, and vehicle measurement information 24, acquiring unit 50 acquires position information on first vehicle 12a in which first wireless device 10a is mounted. The position information may be represented by a latitude and a longitude. In this exemplary embodiment, a method of acquiring the position information may be a known technique and thus will not be described herein. Acquiring unit 50 outputs this position information to automated driving task execution unit 26, calculating unit 52, and transmission processor 54.

Ideal route 28 is a path regarded as being ideal for first vehicle 12a. For example, ideal route 28 may be a group of points making up a path extending from a current position or a departure place to a destination. Each of the points may be represented by a latitude and a longitude, similar to the above position information. Ideal route 28, which may be generated by means of a known technique, is supplied to both automated driving task execution unit 26 and calculating unit 52.

Automated driving task execution unit 26 receives the detection result from surrounding state detector 20, the measurement result from GPS device 22, vehicle measurement information 24, the position information from acquiring unit 50, and ideal route 28. Based on the received information, automated driving task execution unit 26 controls the automated driving of first vehicle 12a. A process in automated driving task execution unit 26 may be a known technique and thus will not be described herein. Automated driving task execution unit 26 controls accelerator actuator 32, steering wheel actuator 34, and brake actuator 36. Accelerator actuator 32, steering wheel actuator 34, and brake actuator 36 are devices that automatically operate an accelerator, a steering wheel, and a brake, respectively, in first vehicle 12a.

Figure 3A:
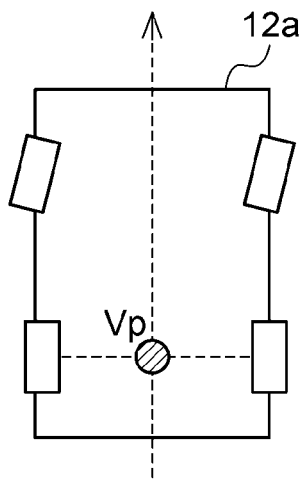
FIG. 3A illustrates an outline of a process in a calculating unit in FIG. 2.
Figure 3B:
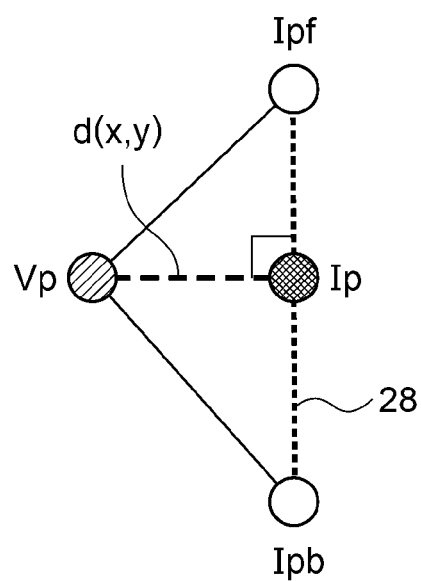
FIG. 3B illustrates another outline of the process in the calculating unit in FIG. 2.
Figure 3C:
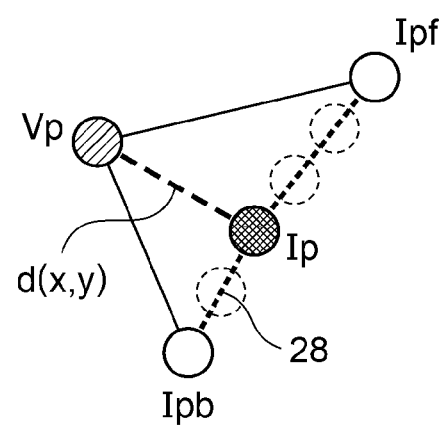
FIG. 3C illustrates still another outline of the process in the calculating unit in FIG. 2.

Calculating unit 52 receives the position information and ideal route 28 from acquiring unit 50. Then, calculating unit 52 calculates a difference between the position information and ideal route 28. In this exemplary embodiment, the difference may be represented by a latitude and a longitude. FIGS. 3A to 3C each illustrate an outline of a process in calculating unit 52. FIG. 3A is a plan view of first vehicle 12a as seen from the top. In this case, Vp that is set to a midpoint between both rear wheels of first vehicle 12a corresponds to the above position information.

FIG. 3B illustrates a process performed in a case where ideal route 28 is straight. Calculating unit 52 calculates distances between the position information Vp and individual points on ideal route 28 and selects two points on the shorter side. FIG. 3B illustrates points Ipf and Ipb; point Ipf is positioned in a moving direction of first vehicle 12a, and point Ipb is positioned in the direction opposite to the moving direction of first vehicle 12a. Calculating unit 52 makes linear interpolation between points Ipf and Ipb and then creates a line by which point Ipf is connected to point Ipb. In addition, calculating unit 52 determines, on the created line, point Ip having the shortest distance to position information Vp. In this case, the difference between position information Vp and point Ip is expressed as d (x, y).

FIG. 3C illustrates a process performed in a case where ideal route 28 is not limited to be straight. As described above, calculating unit 52 selects points Ipf and Ipb. Then, calculating unit 52 determines whether ideal route 28 is straight or curved, in consideration of points in front of and in back of points Ipf and Ipb. If ideal route 28 is curved, calculating unit 52 makes spline interpolation to determine point Ip having the shortest distance to position information Vp. In this case, the difference between position information Vp and point Ip is also expressed as d (x, y). It should be noted that calculating unit 52 does not necessarily have to make the spline interpolation. Alternatively, calculating unit 52 may set d (x, y) to a difference between position information Vp and a point having the shortest distance to position information Vp. The description returns to FIG. 2. Calculating unit 52 outputs the difference to transmission processor 54.

Vehicle information 30 is information on a vehicle. As an example, vehicle information 30 may be vehicle attribute information. Vehicle information 30 is supplied to transmission processor 54. Transmission processor 54 receives the position information from acquiring unit 50, the difference from calculating unit 52, vehicle measurement information 24, and vehicle information 30. Then, transmission processor 54 generates a packet signal containing the received information. Transmission processor 54 outputs the generated packet signal to communication unit 56. Communication unit 56 that supports inter-vehicle communication notifies the packet signal from transmission processor 54. In other words, communication unit 56 transmits the difference and the position information. Communication unit 56 also receives a packet signal from another wireless device 10.

Then, communication unit 56 outputs the received packet signal to reception processor 58. Reception processor 58 processes the packet signal from communication unit 56.

The above configuration can be implemented using a central processing unit (CPU), memory, and other large scale integration (LSI) of any given computer in terms of hardware and using a program loaded on the memory in terms of software. The drawings herein illustrate functional blocks achieved through coordination of these components. Hence, it will be understood by those skilled in the art that these functional blocks can be achieved in various forms by the hardware alone or by combinations of the hardware and the software.

Figure 4:
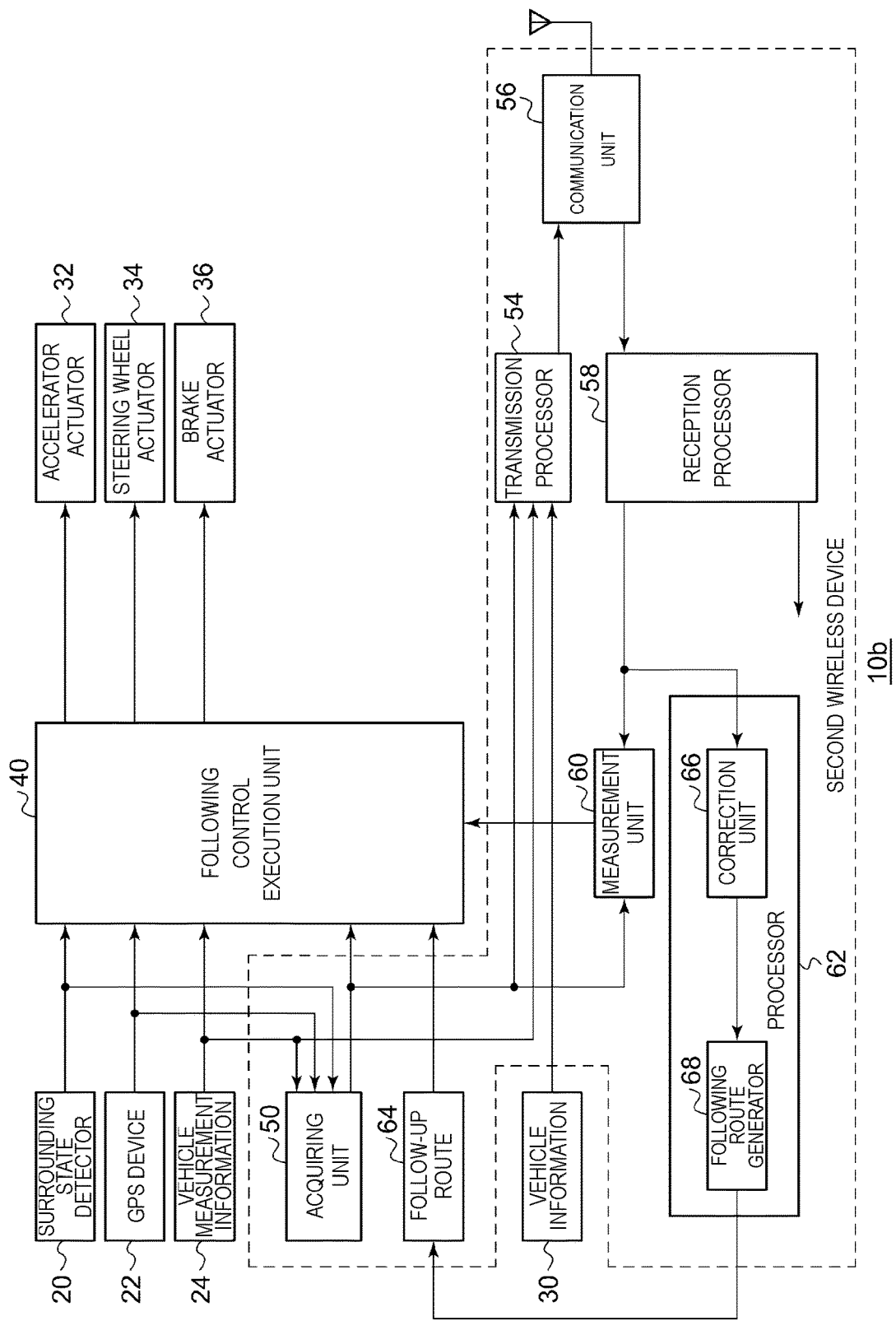
FIG. 4 illustrates a configuration of a second wireless device in FIG. 1.

FIG. 4 illustrates a configuration of second wireless device 10b. Second wireless device 10b is connected to surrounding state detector 20, GPS device 22, vehicle measurement information 24, vehicle information 30, accelerator actuator 32, steering wheel actuator 34, brake actuator 36, and following control execution unit 40. Second wireless device 10b includes acquiring unit 50, transmission processor 54, communication unit 56, reception processor 58, measurement unit 60, processor 62, and following route 64. Processor 62 includes correction unit 66 and following route generator 68. Although second wireless device 10b and first wireless device 10a have substantially the same configuration, FIG. 4 illustrates the configuration required for a process in second wireless device 10b, and FIG. 2 illustrates the configuration required for a process in first wireless device 10a.

Communication unit 56 receives the packet signal from first wireless device 10a mounted in first vehicle 12a. This packet signal contains the position information on first vehicle 12a and the difference between ideal route 28 for first vehicle 12a and the position information on first vehicle 12a. Then, communication unit 56 outputs the received packet signal to reception processor 58. Reception processor 58 receives the packet signal from communication unit 56. Then, reception processor 58 outputs the position information to measurement unit 60 and further outputs both the difference and the position information to correction unit 66.

Figure 5A:
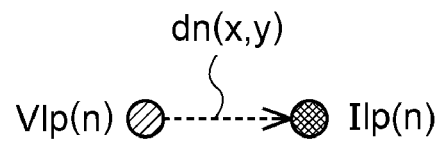
FIG. 5A illustrates an outline of a process in a processor in FIG. 4.
Figure 5B:
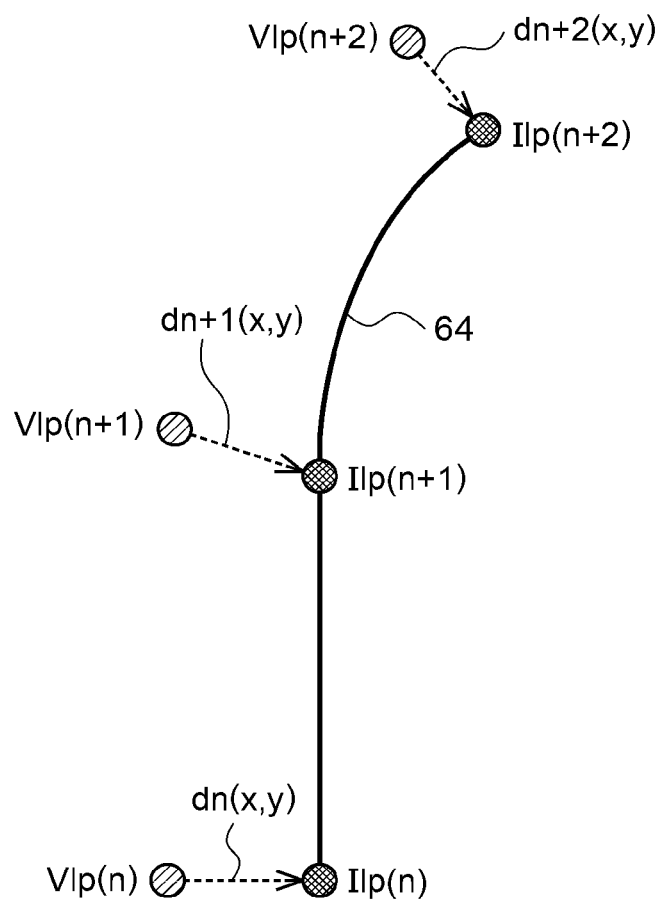
FIG. 5B illustrates another outline of the process in the processor in FIG. 4.

Correction unit 66 receives both the difference and the position information from reception processor 58. Then, correction unit 66 generates ideal position information by correcting the position information with the difference. Correction unit 66 outputs the ideal position information to following route generator 68. FIGS. 5A to 5B each illustrate an outline of a process in processor 62. FIG. 5A illustrates the process in correction unit 66. Vlp (n) denotes the position information, dn (x, y) denotes the difference, and Ilp (n) denotes the ideal position information. FIG. 5B will be referenced later, and the description returns to FIG. 4.

Following route generator 68 receives the ideal position information from correction unit 66. Then, following route generator 68 generates following route 64 along which second vehicle 12b is to run, based on a history in the ideal position information. FIG. 5B illustrates a process in following route generator 68. Following route generator 68 generates following route 64 by connecting Ilp (n), Ilp (n+1), and Ilp (n+2). In this way, processor 62 performs the process, based on the difference and position information that are contained in the signal received by communication unit 56. The following route 64 is supplied to following control execution unit 40.

Measurement unit 60 receives the position information from acquiring unit 50 and further receives the position information from reception processor 58. Then, measurement unit 60 calculates an error between the position information from acquiring unit 50 and the position information from reception processor 58. Measurement unit 60 outputs the error to following control execution unit 40.

Following control execution unit 40 receives a detection result from surrounding state detector 20, a measurement result from GPS device 22, vehicle measurement information 24, position information from acquiring unit 50, the error from measurement unit 60, and following route 64. Based on the received information, following control execution unit 40 controls the running of second vehicle 12b so as to follow first vehicle 12a. Following control execution unit 40, which may employ a known technique and thus will not be described herein, controls accelerator actuator 32, steering wheel actuator 34, and brake actuator 36.

Figure 6A:
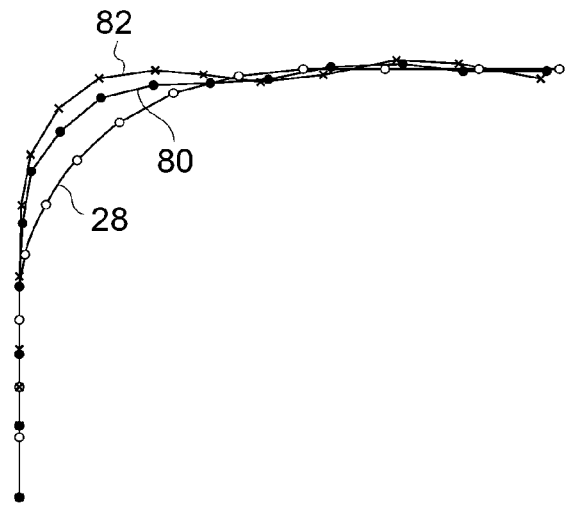
FIG. 6A illustrates an effect of a process in a first exemplary embodiment.
Figure 6B:
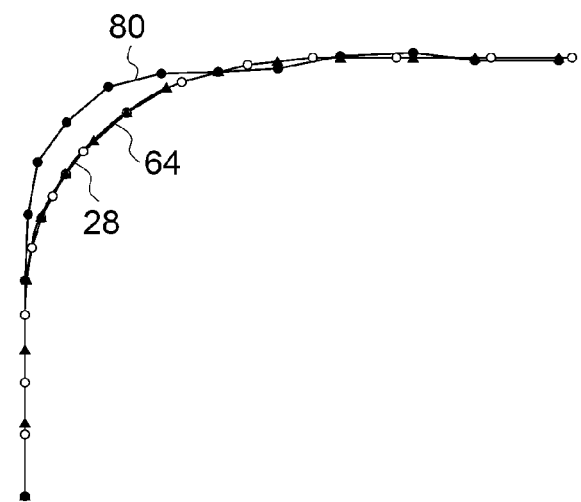
FIG. 6B illustrates another effect of the process in the first exemplary embodiment.

FIGS. 6A to 6D each illustrate an effect of the process in the first exemplary embodiment. FIG. 6A illustrates comparative data in a case where ideal route 28 is curved. Leading vehicle running route 80 is a path along which first vehicle 12a has actually run. As illustrated in FIG. 6A, leading vehicle running route 80 deviates from ideal route 28. Following vehicle running route 82 is a path along which second vehicle 12b follows the position information on first vehicle 12a. Following vehicle running route 82 deviates from ideal route 28 more greatly than leading vehicle running route 80 does. FIG. 6B illustrates a result of processing according to the first exemplary embodiment in a case where the ideal route is curved. Ideal route 28 and leading vehicle running route 80 are illustrated in the same manner as ideal route 28 and leading vehicle running route 80 in FIG. 6A. However, following route 64 is closer to ideal route 28 than leading vehicle running route 80 is.

Figure 6C:
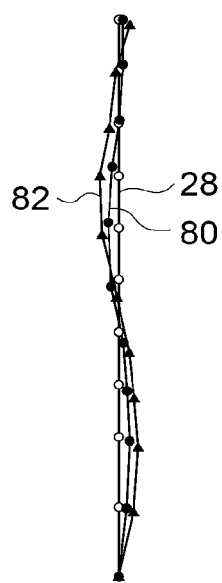
FIG. 6C illustrates still another effect of the process in the first exemplary embodiment.
Figure 6D:
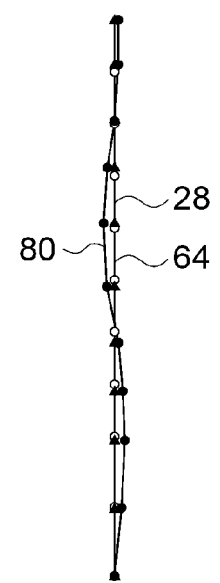
FIG. 6D illustrates yet another effect of the process in the first exemplary embodiment.

FIG. 6C illustrates comparative data in a case where ideal route 28 is straight. Leading vehicle running route 80 is substantially straight but meanderingly deviates from ideal route 28. Following vehicle running route 82 deviates from ideal route 28 more greatly than leading vehicle running route 80 does. FIG. 6D illustrates a result of processing according to the first exemplary embodiment in a case where the ideal route is straight. Ideal route 28 and leading vehicle running route 80 are illustrated in the same manner as ideal route 28 and leading vehicle running route 80 in FIG. 6A. Following route 64, which is substantially straight, is closer to ideal route 28 than leading vehicle running route 80 is.

A description will be given of an operation of communication system 100 configured above. FIG. 7 is a flowchart of calculating procedures performed by calculating unit 52. Calculating unit 52 acquires points (Ipf, Ipb) positioned close to position information (Vp). From points in front of and in back of the acquired points, then, calculating unit 52 determines whether ideal route 28 is straight or curved (S30). When ideal route 28 is straight (Y at S32), calculating unit 52 makes the linear interpolation between the points (S34). When ideal route 28 is not straight (N at S32), calculating unit 52 makes the spline interpolation between the points (S36). Then, calculating unit 52 calculates a point (Ip) having the minimum position information relative to the interpolated line (S38). Calculating unit 52 acquires a difference [d (x, y)] represented by a latitude and a longitude (S40).

According to this exemplary embodiment, first wireless device 10a transmits, to second wireless device 10b, position information on a leading vehicle as well as a difference between the position information and an ideal route for the leading vehicle. Second wireless device 10b thereby is notified of a deviation of a trajectory of the leading vehicle from the ideal route. Since second wireless device 10b is notified of the deviation of the trajectory of the leading vehicle from the ideal route, second wireless device 10b enables a following vehicle to perform following drive along a route that is close to the ideal route. Furthermore, since second wireless device 10b receives the position information on the leading vehicle as well as the difference between the position information and the ideal route for the leading vehicle, the following vehicle can perform the following drive along the route that is close to the ideal route. Moreover, second wireless device 10b corrects the position information with the difference and then generates a following route. Second wireless device 10b thereby can make the following route approximate to the ideal route.

Since the difference is received, second wireless device 10b can generate the following route that is close to the ideal route without receiving the ideal route. Since the ideal route is not received, second wireless device 10b can perform the following drive using inter-vehicle communication with a low rate and a high security level. This makes communication between the leading and following vehicles unnecessary, thereby preventing an occurrence of any additional process. The following vehicle reproduces a path along which the following vehicle is about to run, instead of generating information on a latitude and longitude of the leading vehicle. Therefore, the following vehicle can generate a route so as to be most suitable for current environment. First wireless device 10a notifies second wireless device 10b of the difference in a broadcasting manner. Second wireless device 10b thereby can acquire the following route that is similar to the ideal route.

Second Exemplary Embodiment

Next, the second exemplary embodiment will be described. The second exemplary embodiment is similar to the foregoing first exemplary embodiment, in relating to a communication system that causes a vehicle to make following drive, and more particularly, relating to a wireless device mounted in a following vehicle. The second exemplary embodiment aims to cause a following vehicle to run closer to an ideal route than a leading vehicle does. Communication system 100 and first wireless device 10a according to the second exemplary embodiment are substantially the same as communication system 100 and first wireless device 10a illustrated in FIGS. 1 and 2. The following description will be mainly centered on a difference from the first exemplary embodiment.

Figure 8:
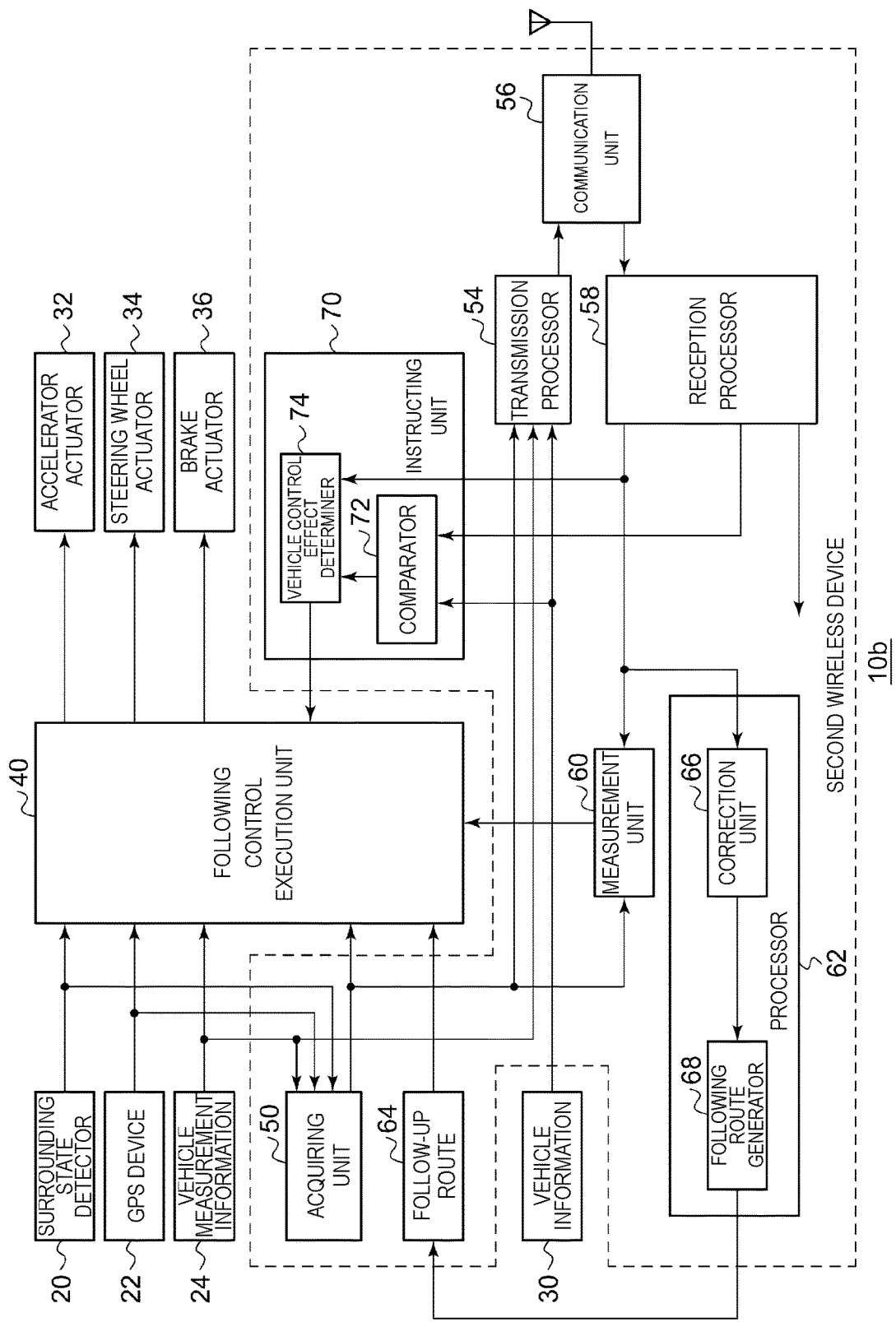
FIG. 8 illustrates a configuration of a second wireless device according to a second exemplary embodiment of the present invention.

FIG. 8 illustrates a configuration of second wireless device 10b. Second wireless device 10b includes acquiring unit 50, transmission processor 54, communication unit 56, reception processor 58, measurement unit 60, processor 62, following route 64, and instruction unit 70. Processor 62 includes correction unit 66 and following route generator 68; instruction unit 70 includes comparator 72 and vehicle control effect determiner 74.

Communication unit 56 receives a packet signal that contains vehicle information 30 on first vehicle 12a. Reception processor 58 outputs a difference to vehicle control effect determiner 74 and further outputs vehicle information 30 on first vehicle 12a to comparator 72.

Vehicle control effect determiner 74 receives the difference from reception processor 58. Vehicle control effect determiner 74 has a threshold to be compared with a magnitude of the difference. When the magnitude of the received difference is greater than the threshold, vehicle control effect determiner 74 decides to change a running condition for second vehicle 12b. One example of a method of changing the running condition includes a method of decreasing a vehicle speed, more specifically, setting the vehicle speed to be lower than a speed of first vehicle 12a. When the magnitude of the difference is greater than the threshold, a trajectory of first vehicle 12a is greater than ideal route 28. One cause is that first vehicle 12a runs at a high speed. To deal with this, vehicle control effect determiner 74 decides to decrease the speed of second vehicle 12b. Another example of the method of changing the running condition includes a method of changing a response of a steering wheel to steering wheel actuator 34. Vehicle control effect determiner 74 instructs following control execution unit 40 to change the running condition.

Comparator 72 receives vehicle information 30 on second vehicle 12b and further receives vehicle information 30 on first vehicle 12a from reception processor 58. Then, comparator 72 extracts a vehicle size, width, and length contained in vehicle information 30 on second vehicle 12b and further extracts a vehicle size, width, and length contained in vehicle information 30 on first vehicle 12a. Comparator 72 compares at least one of these parameter pairs with each other. When the difference is greater than a predetermined value, comparator 72 notifies vehicle control effect determiner 74 that first vehicle 12a greatly differs from second vehicle 12b. When receiving the notification from comparator 72, vehicle control effect determiner 74 decides to change the running condition for second vehicle 12b. The method of changing the running condition has already been described above and thus will not be described again. Vehicle control effect determiner 74 instructs following control execution unit 40 to change the running condition. Following control execution unit 40 reflects the instruction from vehicle control effect determiner 74 in controlling the following drive.

According to this exemplary embodiment, when a difference related to a leading vehicle increases, second wireless device 10b changes a running condition for the following vehicle, thereby making it possible to suppress a following route of the following vehicle from approximating to a trajectory of the leading vehicle. When the difference related to the leading vehicle increases, second wireless device 10b decreases its vehicle speed, thereby making it possible to generate a situation different from a situation under which the leading vehicle is running. Furthermore, when the difference related to the leading vehicle increases, second wireless device 10b changes the response of the steering wheel, thereby making it possible to generate the situation different from the situation under which the leading vehicle is running. By generating the situation different from the situation under which the leading vehicle is running, second wireless device 10b can make the following route approximate to an ideal route. Second wireless device 10b changes the running condition, based on information regarding the leading vehicle and this vehicle, thereby causing the vehicle to run in accordance with the information regarding this vehicle. By causing the vehicle to run in accordance with the information regarding the vehicle, second wireless device 10b can generate the situation different from the situation under which the leading vehicle is running.

Third Exemplary Embodiment

Next, a third exemplary embodiment will be described. The third exemplary embodiment is also similar to the above, in relating to a communication system that causes a vehicle to make following drive, and more particularly, relating to a wireless device mounted in a following vehicle. The third exemplary embodiment aims to recognize a difference in performance between leading and following vehicles and cause the following vehicle to run closer to an ideal route than the leading vehicle does. Communication system 100 and first wireless device 10a according to the third exemplary embodiment are substantially the same as communication system 100 and first wireless device 10a illustrated in FIGS. 1 and 2. The following description will be mainly centered on a difference from the above.

Figure 9:
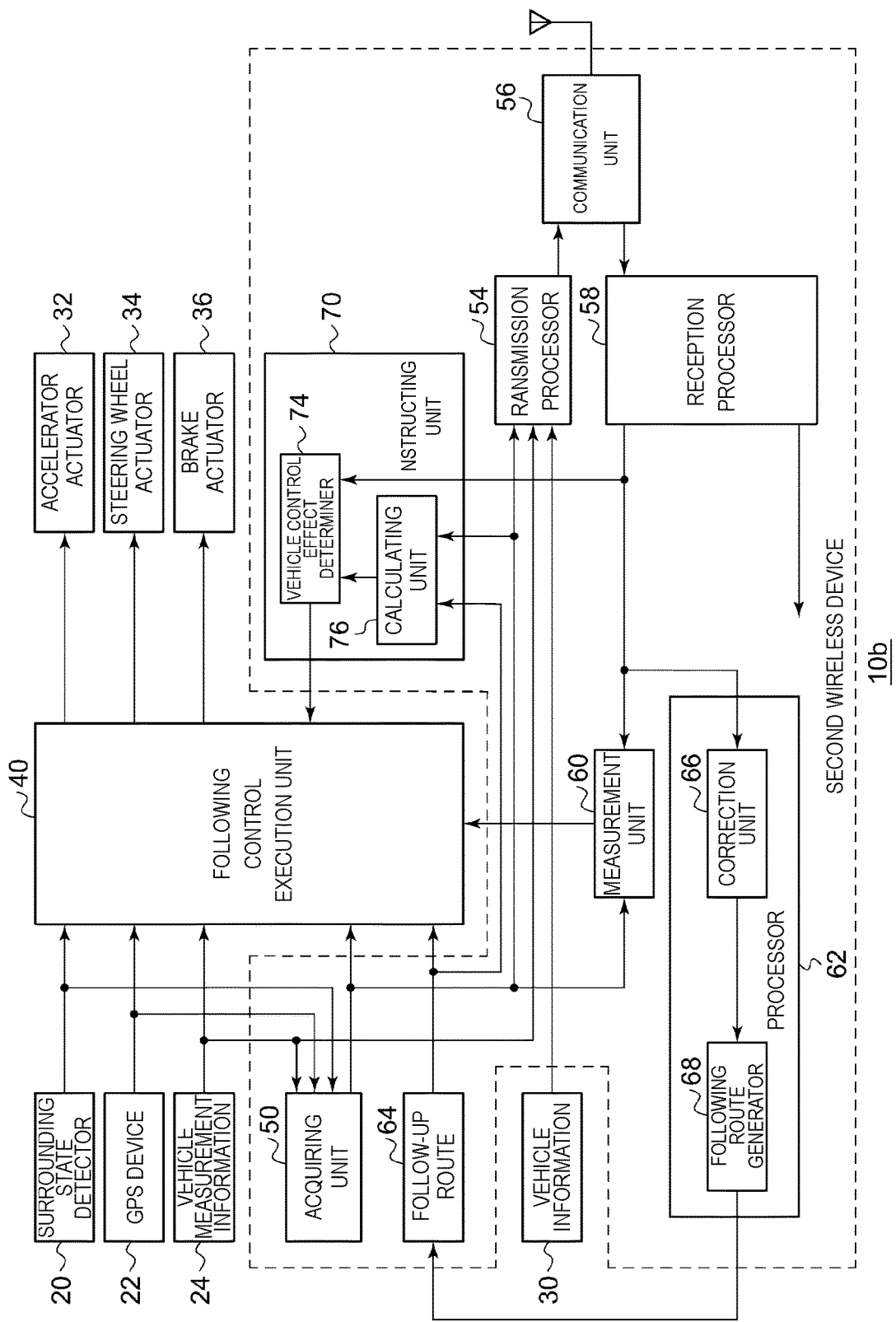
FIG. 9 illustrates a configuration of a second wireless device according to a third exemplary embodiment of the present invention.

FIG. 9 illustrates a configuration of second wireless device 10b. Second wireless device 10b includes acquiring unit 50, transmission processor 54, communication unit 56, reception processor 58, measurement unit 60, processor 62, following route 64, and instruction unit 70. Processor 62 includes correction unit 66 and following route generator 68; instruction unit 70 includes vehicle control effect determiner 74 and calculating unit 76.

Acquiring unit 50 acquires position information on second vehicle 12b. In addition, acquiring unit 50 outputs the position information to calculating unit 76. Calculating unit 76 receives the position information from acquiring unit 50 and further receives following route 64 that following route generator 68 has generated. Then, calculating unit 76 calculates a difference between the position information and following route 64. A method of calculating the difference may be the same as the method performed by calculating unit 52 and thus will not be described herein. Calculating unit 76 supplies the calculated difference to vehicle control effect determiner 74.

Vehicle control effect determiner 74 receives the difference from calculating unit 76 and further receives the difference from reception processor 58. The former corresponds to the difference related to the following vehicle, whereas the latter corresponds to the difference related to the leading vehicle. Vehicle control effect determiner 74 compares both the differences to recognize a difference in performance between the leading and following vehicles. More specifically, when the difference related to the following vehicle is greater than the difference related to the leading vehicle, vehicle control effect determiner 74 decides to change a running condition for second vehicle 12b, which is the following vehicle. The method of changing the running condition has already been described above and thus will not be described again. When the difference related to the following vehicle is smaller than the difference related to the leading vehicle and the difference between both the vehicles is small, the following vehicle sets a distance to the leading vehicle to an appropriate value. In this case, the following vehicle may set its speed to be higher than a speed of the leading vehicle. Vehicle control effect determiner 74 instructs following control execution unit 40 to change the running condition.

According to this exemplary embodiment, second wireless device 10b changes its running condition, based on the differences related to the following and leading vehicles, thereby making it possible to suppress the difference in this vehicle from increasing. By changing its running condition, based on the differences related to the following and leading vehicles, second wireless device 10b can suppress its following route from approximating to a trajectory of the leading vehicle. When the difference related to the following vehicle is greater than the difference related to the leading vehicle, second wireless device 10b decreases the speed of the following vehicle, thereby making it possible to generate a situation different from a situation under which the leading vehicle is running. Furthermore, the difference related to the following vehicle is greater than the difference related to the leading vehicle, second wireless device 10b changes the response of the steering wheel, thereby making it possible to generate the situation different from the situation under which the leading vehicle is running. By generating the situation different from the situation under which the leading vehicle is running, second wireless device 10b can make the following route approximate to an ideal route.

Fourth Exemplary Embodiment

Next, a fourth exemplary embodiment will be described. The fourth exemplary embodiment is also similar to the above, in relating to a communication system that includes wireless devices that conduct inter-vehicle communication. In addition, the wireless devices according to the fourth exemplary embodiment are similar to the above in notifying a packet signal containing a difference. In the fourth exemplary embodiment, however, each vehicle performs automated driving without performing the following drive. For that purpose, each vehicle uses the difference contained in the packet signal. Communication system 100 and first wireless device 10a according to the fourth exemplary embodiment are substantially the same as communication system 100 and first wireless device 10a illustrated in FIGS. 1 and 2. The following description will be mainly centered on a difference from the above.

Figure 10:
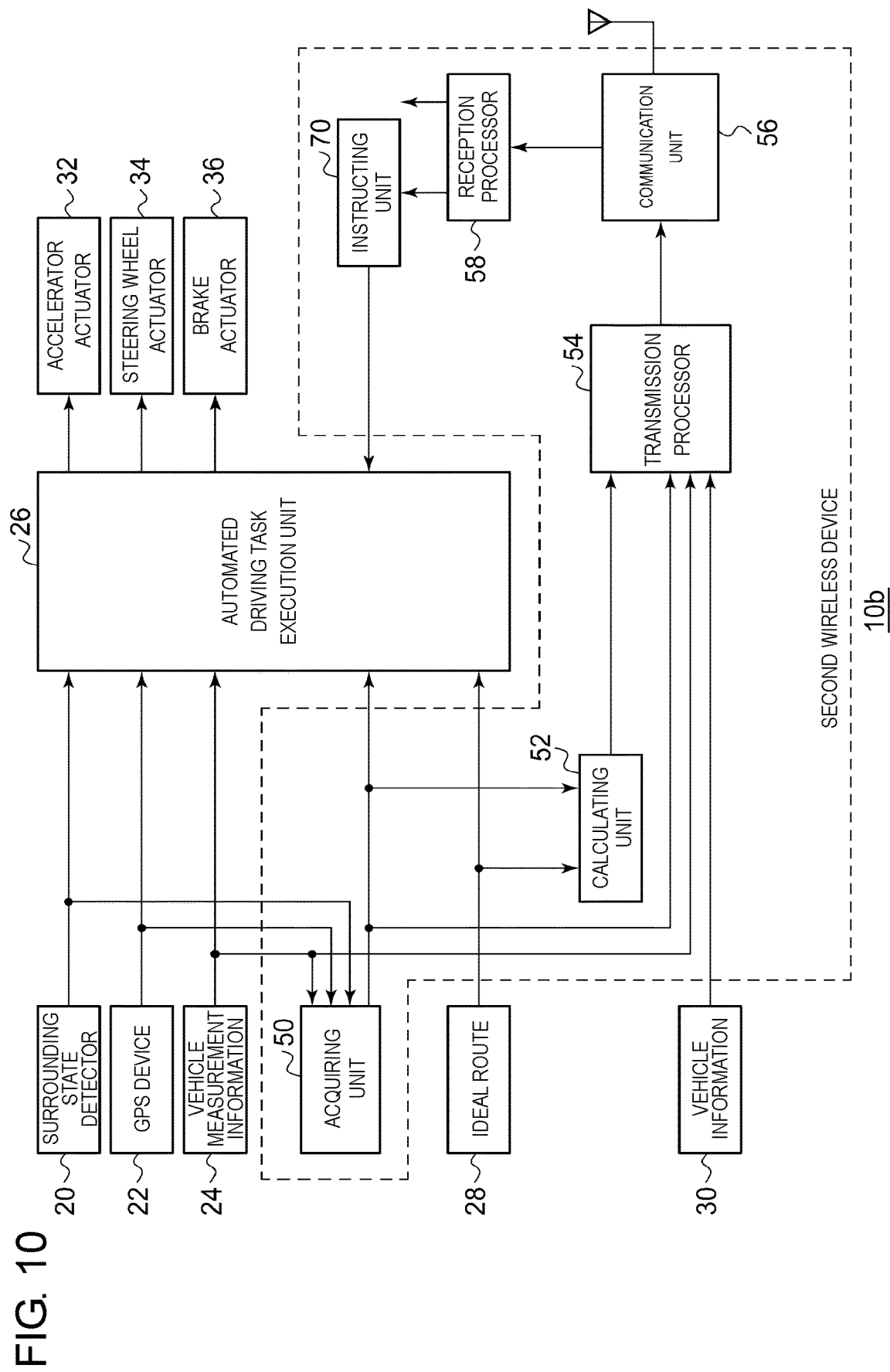
FIG. 10 illustrates a configuration of a second wireless device according to a fourth exemplary embodiment of the present invention.

FIG. 10 illustrates a configuration of second wireless device 10b according to the fourth exemplary embodiment of the present invention. Second wireless device 10b is connected to surrounding state detector 20, GPS device 22, vehicle measurement information 24, automated driving task execution unit 26, ideal route 28, vehicle information 30, accelerator actuator 32, steering wheel actuator 34, and brake actuator 36. Second wireless device 10b includes acquiring unit 50, calculating unit 52, transmission processor 54, communication unit 56, reception processor 58, and instruction unit 70.

Reception processor 58 outputs the difference to instruction unit 70. Instruction unit 70 receives the difference from reception processor 58. Instruction unit 70 has a threshold to be compared with a magnitude of the difference. When the magnitude of the received difference is greater than the threshold, instruction unit 70 decides to change a running condition for second vehicle 12b. The method of changing the running condition has already been described above and thus will not be described again. Vehicle control effect determiner 74 instructs automated driving task execution unit 26 to change the running condition. Automated driving task execution unit 26 reflects the instruction from vehicle control effect determiner 74 in controlling automated driving of second vehicle 12b.

According to the exemplary embodiment of the present invention, when a difference related to a first vehicle increases, second wireless device 10b changes its running condition for a second vehicle, thereby making it possible to suppress a difference related to the second vehicle from approximating to the difference related to the first vehicle. This can also suppress the difference related to the second vehicle from increasing, thereby causing the second vehicle to automatically run along a route that is close to an ideal route.

The present invention has been described based on the exemplary embodiments. It will be understood by those skilled in the art that these exemplary embodiments are merely examples, that other exemplary modifications in which components and/or processes of the exemplary embodiments are variously combined are possible, and that the other exemplary modifications still fall within the scope of the present invention.

In the first to fourth exemplary embodiments, first vehicle 12a performs automated driving. However, the present invention is not limited to this. As an alternative example, a driver may manually drive first vehicle 12a, without automated driving. The modification can improve the degree of freedom in the configuration.

An outline of an aspect of the present invention is as follows. A transmission device according to an aspect of the present invention is a transmission device that is mountable in a vehicle. This transmission device includes: an acquiring unit that acquires position information on the vehicle in which the transmission device is mounted; a calculating unit that calculates a difference between the position information acquired by the acquiring unit and an ideal route for the vehicle; and a transmitter that transmits the difference calculated by the calculating unit and the position information acquired by the acquiring unit.

According to this aspect, the transmission device transmits the position information on the vehicle as well as the difference between the position information and the ideal route. This enables the vehicle to perform following drive along the route that is close to the ideal route.

Another aspect of the present invention is a reception device. This device is a reception device that is mountable in a vehicle. The reception device includes: a receiver that receives a signal from a transmission device mounted in another vehicle, the signal containing position information on the other vehicle and a difference between the position information on the other vehicle and an ideal route for the other vehicle; and a processor that performs a process, based on the difference and the position information that are contained in the signal received by the receiver.

According to this aspect, the reception device receives the position information on the other vehicle as well as the difference between the position information and the ideal route for the other vehicle. This enables the vehicle to perform following drive along the route that is close to the ideal route.

The processor may include: a correction unit that corrects the position information with the difference; and a following route generator that generates a following route of the vehicle in which the reception device is mounted, based on a history of the position information corrected by the correction unit. In this case, the processor corrects the position information with the difference and then generates the following route, thereby making it possible to make the following route approximate to the ideal route.

The reception device may further include an instruction unit that, when a magnitude of the difference contained in the signal received by the receiver is greater than a threshold, changes a running condition for the vehicle. In this case, the instruction unit changes the running condition for the vehicle when the difference related to the other vehicle increases, thereby making it possible to suppress the following route of the vehicle from approximating to a trajectory of the other vehicle.

The signal received by the receiver may contain information regarding the other vehicle. The reception device may further include an instruction unit that changes a running condition for the vehicle, based on the information regarding the other vehicle and information regarding the vehicle which are contained in the signal received by the receiver. In this case, the instruction unit changes the running condition, based on the information regarding the other vehicle and the information regarding the vehicle, thereby causing the vehicle to run in accordance with the information regarding the vehicle.

The reception device may further include: an acquiring unit that acquires the position information on the vehicle; a calculating unit that calculates a difference between the position information acquired by the acquiring unit and the following route generated by the following route generator; and an instruction unit that changes a running condition for the vehicle, based on the difference calculated by the calculating unit and the difference contained in the signal received by the receiver. In this case, the instruction unit changes the running condition, based on the differences related to the vehicle and the other vehicle, thereby making it possible to suppress the difference in the vehicle from increasing.

Further another aspect of the present invention is a transmission method. This method is a transmission method in a transmission device that is mountable in a vehicle. The transmission method includes: acquiring position information on the vehicle in which the transmission device is mounted; calculating a difference between the acquired position information and an ideal route for the vehicle; and transmitting the calculated difference and the acquired position information.

Still another aspect of the present invention is a reception method. This method is a reception method in a reception device that is mountable in a vehicle. The reception method includes: receiving a signal from a transmission device mounted in another vehicle, the signal containing position information on the other vehicle and a difference between the position information on the other vehicle and an ideal route for the other vehicle; and performing a process, based on the difference and the position information that are contained in the received signal.

Yet another aspect of the present invention is a communication system. This communication system includes: a transmission device that is mountable in a vehicle; and a reception device that is mountable in another vehicle. The transmission device includes: an acquiring unit that acquires position information on the vehicle in which the transmission device is mounted; a calculating unit that calculates a difference between the position information acquired by the acquiring unit and an ideal route for the vehicle; and a transmitter that transmits the difference calculated by the calculating unit and the position information acquired by the acquiring unit. The reception device includes: a receiver that receives the difference and the position information from the transmission device; and a processor that performs a process, based on the difference and the position information that are received by the receiver.

INDUSTRIAL APPLICABILITY

A transmission device and a reception device according to an exemplary embodiment of the present invention are expected to be used as a transmission device, a reception device, a transmission method, a reception method, and a communication system.

REFERENCE MARKS IN THE DRAWINGS 10 wireless device
10a first wireless device
10b second wireless device
12 vehicle
20 surrounding state detector 22 GPS device
24 vehicle measurement information
26 automated driving task execution unit
28 ideal route
30 vehicle information
32 accelerator actuator
34 steering wheel actuator
36 brake actuator
40 following control execution unit
50 acquiring unit
52 calculating unit
54 transmission processor
56 communication unit
58 reception processor
60 measurement unit
62 processor
64 following route
66 correction unit
68 following route generator
100 communication system

The invention claimed is:

1. A reception device that is mountable in a vehicle, comprising:
 a receiver that receives a signal from a transmission device mounted in another vehicle, the signal containing position information on the another vehicle and a difference between the position information on the another vehicle and an ideal route for the another vehicle; and
 a processor and a memory that stores a set of executable instructions such that the processor, when executing the set of executable instructions, causes the processor to perform:
  a process, based on the difference and the position information that is contained in the signal received by the receiver, and
  changing a running condition for the vehicle when a magnitude of the difference contained in the signal received by the receiver is greater than a threshold.

2. The reception device according to claim 1, wherein the processor, when executing the set of executable instructions, causes the processor to further perform:
 correcting the position information on the another vehicle with the difference; and
 generating a following route of the vehicle in which the reception device is mounted, based on a history of the corrected position information.

3. The reception device according to claim 2, wherein:
 the difference is defined as a first difference,
 the processor, when executing the set of executable instructions, causes the processor to further perform:
 acquiring the position information on the vehicle;
 calculating a second difference between the position information of the vehicle and the following route; and
 changing the running condition for the vehicle, based on the first difference and the second difference.

4. The reception device according to claim 1, wherein the signal received by the receiver contains first information corresponding to the another vehicle, and
 the processor, when executing the set of executable instructions, causes the processor to further perform changing the running condition for the vehicle, based on the first information regarding the another vehicle and second information corresponding to the vehicle, the first information being contained in the signal received by the receiver.

5. A reception method in a reception device that is mountable in a vehicle, the reception method comprising:
 receiving a signal from a transmission device mounted in another vehicle, the signal containing position information on the another vehicle and a difference between the position information on the another vehicle and an ideal route for the another vehicle;
 performing a process, based on the difference and the position information that is contained in the received signal; and
 changing a running condition for the vehicle when a magnitude of the difference contained in the signal received by the receiver is greater than a threshold.

6. A communication system comprising:
 a transmission device that is mountable in a vehicle, the transmission device including:
 a transmission processor and a transmission memory that stores a set of executable transmission instructions such that the transmission processor, when executing the set of executable transmission instructions, causes the transmission processor to perform:
 acquiring position information on the vehicle in which the transmission device is mounted, and
 calculating a difference between the acquired position information and an ideal route for the vehicle, and
 a transmitter that transmits the calculated difference and the acquired position information,
 a reception device that is mountable in another vehicle, the reception device including:
 a receiver that receives a signal from the transmission device, the signal containing the difference and the position information from the transmission device, and
 a reception processor and a reception memory that stores a set of executable reception instructions such that the reception processor, when executing the set of executable reception instructions, causes the reception processor to perform:
 a process, based on the difference and the position information that is contained in the signal received by the receiver, and
 changing a running condition for the another vehicle when a magnitude of the difference contained in the signal received by the receiver is greater than a threshold.

* * * * *